Sept. 4, 1923.
H. TOTSCHNIG
SURVEYING INSTRUMENT
Filed March 9, 1921
1,467,075
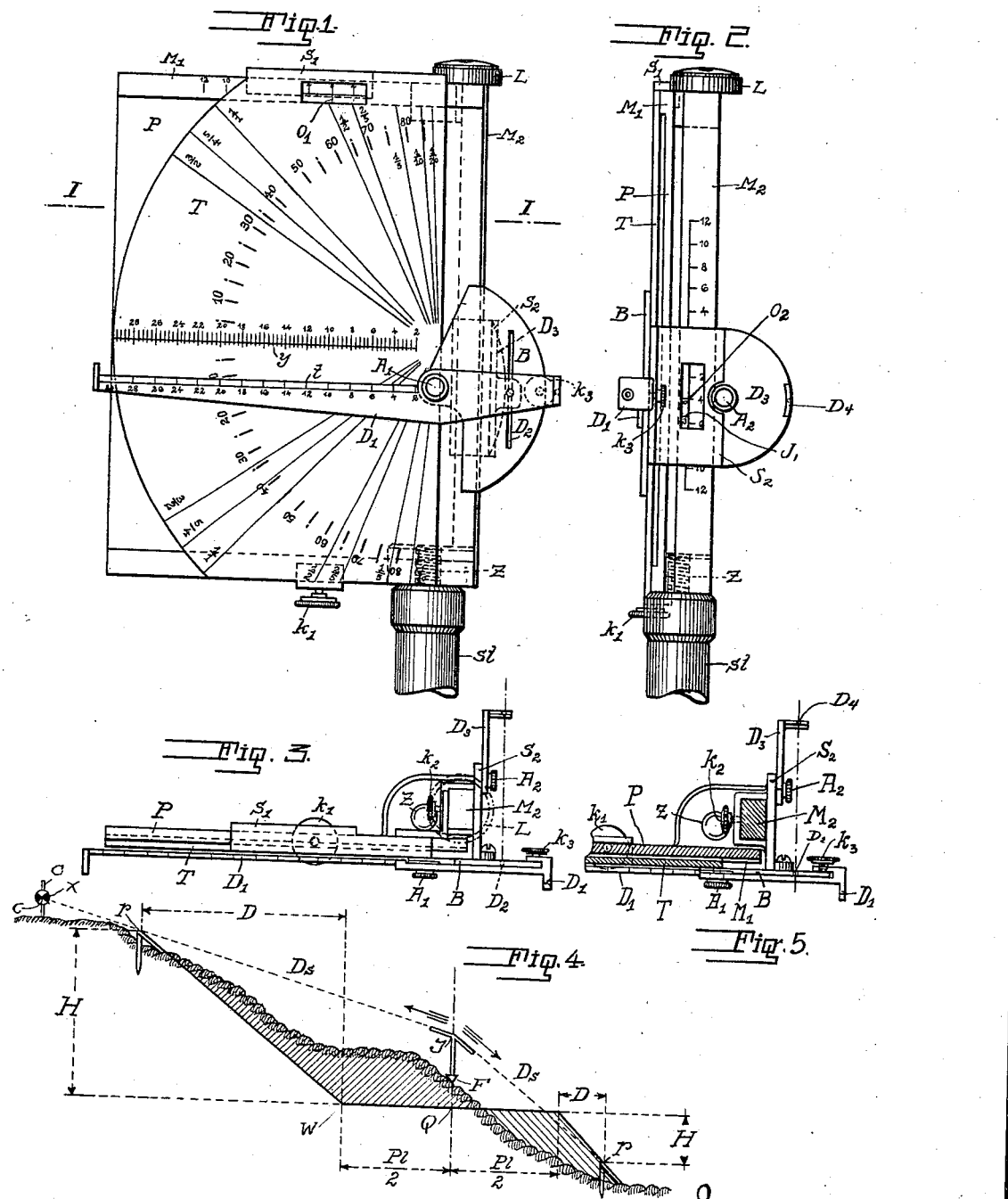

Patented Sept. 4, 1923.

1,467,075

UNITED STATES PATENT OFFICE.

HIERONYMUS TOTSCHNIG, OF LIENZ, AUSTRIA.

SURVEYING INSTRUMENT.

Application filed March 9, 1921. Serial No. 451,044.

(GRANTED UNDER THE PROVISIONS OF THE ACT OF MARCH 3, 1921, 41 STAT. L., 1313.)

*To all whom it may concern:*

Be it known that I, HIERONYMUS TOTSCHNIG, a citizen of the Republic of Austria, residing at No. 20 Lienz, Tyrol, Austria, have made a certain new and useful Improvement in Surveying Instruments (for which I have filed application in Austria Sept. 8, 1917; Hungary, June 4, 1919; Germany, Sept. 25, 1918; France, May 26, 1919; Italy, Aug. 20, 1919; Switzerland, May 26, 1919; Patent No. 88,918; Czechoslovakia, May 22, 1919; Great Britain, Dec. 2, 1920), of which the following is a specification.

Surveying instruments are known which comprise a vertically arranged limb upon which is rotatably mounted an alidade provided with divisions along its length and fitted with a sighting device.

According to this invention, the limb and the alidade are mounted adjustably in two guides at right angles to each other; provision is made for reading these adjustments by means of suitable devices well known in themselves. On the guide part used for the movement of the alidade, is mounted a second sighting device, the line of sight of which is at right angles to that of the alidade.

A construction according to the invention is illustrated by way of example in the accompanying drawing in which—

Figure 1 shows it in the instrument in front elevation;

Figure 2 in side elevation; and

Figure 3 in plan view.

Figure 4 illustrates a method of using the instrument; and Figure 5 is a section on line I—I of Figure 1.

The instrument comprises a plate P on which is mounted a horizontal guide $M_1$ and a vertical guide $M_2$. Both guides are provided with length scales of the same unit. The plate P is adjoined by a plate T which can be moved by means of a slide $S^1$ and locked to the plate P by means of a clamping-screw $k_1$. In the slide $s_1$ is provided a recess for reading the scale, with an index mark $o_1$. The instrument may be levelled in the usual manner, such as for instance by a box level L mounted on the plate P. As shown in Figure 1, the plate T is provided with a scale for measuring lengths of the same unit as the two scales of lengths $M_1$ and $M_2$ already described and further with a scale of gradients. The common gradients of slope (as for example $$\frac{1}{1}, \frac{5}{4}, \frac{3}{2},$$

etc.) are particularly marked on the scale of gradients. The disc B with the alidade $D_1$, which is pivotally connected thereto by means of a pin $A_1$, is secured to the slide $S_2$ of the guide $M_2$. The plate B is also provided with a fine slot $D_2$. The edge $t$ of the alidade $D_1$ is provided with suitable divisions along its length. The centre of the pin $A_1$ is the zero point of the scale of lengths. The locking of the alidade $D_1$ is effected by means of the clamping device $k_3$.

The slide $s_2$ with the clamping device $k_2$ (Figure 3) is also provided with a recess for reading the scale of the guide $M_2$ by means of the index mark $o_2$. A semi-circular plate $D_3$, provided with a small circular sighting opening $D_4$ (Figure 2) in the slide $s_2$, is rotatable about the pin $A_2$ and forms with the slot $D_2$ of the plate B a sighting device. The instrument is screwed on a column $st$ which may be supported in a suitable stand, by means of a screw-stud $z$.

The use of surveying instrument for marking out or setting out the transverse profile of a road or railway track will now be described with reference to Fig. 4.

The instrument is screwed on the column $st$ which is supported by means of a stand suitable for the purpose and is centered on the peg F, the instrument being levelled by means of the levelling device L. For pegging out railway-tracks or roads the operator sights by means of the sighting device $D_2$, $D_4$ along the line marking the course of survey and locks the column in the stand. Now the plane of the plate T of the instrument is positioned at a right angle to the line of the course to be pegged out.

The operation then proceeds as follows:

The half width of the level bed $$W - Q = \frac{Pl}{2}$$

is set off on the plate T by moving the slide $s_1$ to the left hand side until the mark $0_1$ on the slide coincides with the scale-mark on the guide $M_1$ which corresponds to $\frac{Pl}{2}$.

Thereafter the plate T is locked in the adjusted position to the plate P by means of the screw $k_1$. The slide $s_2$ connected with the alidade $D_1$ is moved upwardly for the distance Q—F on the guide $M_2$ if a cutting is to be made (as shown in Fig. 4) or the said slide is correspondingly moved downwardly in case it is intended to fill. Now the slide $s_2$ is locked in the adjusted position by means of a screw $k_2$. Thereby the height of the instrument above the peg F (a distance designated by F—J in Fig. 4) is also adjusted by allowing to coincide with the division-mark on the guide $M_2$ (corresponding to the distance Q—F) the mark $J_1$ of the slide $s_2$ and not the mark $0_2$.

The distance F—J, e. g., the distance between the zero-point $0_2$ on the scale $M_2$ and the peg F, has to be determined once for all for every instrument in accordance with the length of the column $st$ and is a constant. The mark $J_1$ corresponding to this distance has to be engraved or marked on the slide $s_2$.

Now a tracing bar C is rammed into the ground a suitable distance away from the instrument and by means of the alidade a point $c$ is sighted on the tracing bar and is marked thereon by a sighting disc X. The alidade is now locked by means of the screw $k_3$. The point of intersection of the alidade-edge $t$ with the desired gradient of slope on the plate T renders it possible to read-off the length D$s$ on the alidade-edge $t$. This length measured in the sighting direction determines in nature the point $p$. This point $p$ is fixed by driving in a peg which is cut off in the height of the sighting line, the profile can then be set at once.

In order to obtain the important dimensions D and H, the clamping screw $k_2$ is loosened, and without altering the adjusted sighting direction of the alidade, the slide $s_2$ is pushed toward the horizontal scale $y$ on the plate T until the reading D$s$ on the alidade-edge $t$ intersects the horizontal scale $y$. The slide is thereupon locked by means of the clamping screw $k_2$, and the value of D is read on the horizontal scale $y$. The distance by which the slide $s_2$ has been adjusted on the scale division of the guide $M_2$ (Figure 2) gives the desired H.

Having thus described my invention, what I claim as new and desire to secure by Letters Patent is:—

1. A surveying instrument, comprising a normally vertical limb, an alidade mounted for angular movement relatively to the same in a vertical plane and guides for adjusting the limb and the alidade in directions at right angle to each other.

2. A surveying instrument, comprising a support, guides thereon at right angle to each other normally in a horizontal plane and a vertical plane respectively, a normally vertical limb movably supported upon the horizontal guide, an alidade and a pivotal support therefor adjustable along the vertical guide.

3. Device according to claim 2 including means defining a line of sight along the alidade and means defining a line of sight at right angle thereto.

4. A surveying instrument, comprising a standard defining a normally vertical guide and a guide disposed at right angle thereto in a normally horizontal direction, a plate normally disposed in a vertical plane movably supported on the horizontal guide, a slide on the vertical guide and an alidade pivotally supported on the slide for movement in a vertical plane, sights of the alidade and means defining a line of sight at right angle to line established by the alidade.

In testimony whereof I have signed my name to this specification.

HIERONYMUS TOTSCHNIG.